United States Patent Office 2,903,475
Patented Sept. 8, 1959

2,903,475

PRODUCTION OF ESTERS OF PHOSPHONOUS AND PHOSPHINOUS ACIDS

Charles Lichtenberg Harowitz, Richmond, Va., assignor to Virginia-Carolina Chemical Corporation, Richmond, Va., a corporation of Virginia No Drawing. Application April 16, 1956
Serial No. 578,170

13 Claims. (Cl. 260—461)

This invention relates to a new and improved process of manufacture for aliphatic and aromatic esters of aliphatic and aromatic phosphonous and phosphinous acids. More particularly, it relates to a new and improved process for the manufacture of compounds of the general formula $$(R)_mP(OR')_n$$

in which R is an aliphatic or aromatic radical, R' is an aliphatic or aromatic radical and in which $m$ and $n$ are integers, the sum of which is 3.

The preparation of these types of compounds by the reaction of aliphatic or aromatic phosphonous dichlorides or dialiphatic or diaromatic phosphinous chlorides with alcohols in the presence of an organic base is well known. Suitable bases are pyridine, triethylamine or dimethylaniline. This type of preparation is illustrated by the following reactions:

$$C_2H_5PCl_2 + 2C_2H_5OH + 2(C_2H_5)_3N \xrightarrow{(CO_2\,atm.)}$$
$$C_2H_5P(OC_2H_5)_2 + 2(C_2H_5)_3N\cdot HCl\downarrow$$

(B. A. Arbuzov and N. I. Rizpolozhenskii; A. E. Arbuzov Chem. Inst. Kazan; Doklady Akad. Nauk S.S.S.R. 83, 581 (1952). (C.A. 47, 3226b.)

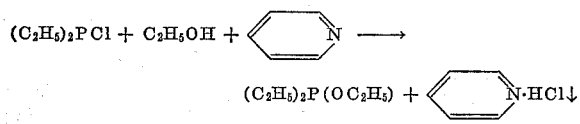

(ibid. 89, 291–2 (1953). (C.A. 48, 7540i.)

In preparing these compounds from the reaction of alcohols or phenols with the phosphonous and phosphinous chlorides, it is necessary to remove the corrosive hydrogen chloride as it is formed. Otherwise, harmful side reactions occur that result in little or no yield of the desired product. This can be illustrated by the following equations:

(1) $\quad RPCl_2 + 2R'OH \rightarrow RP(OR')_2 + 2HCl$ (2) 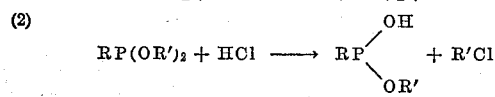

(3) 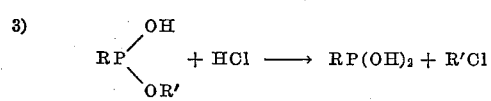

(4) $\quad R'_2PCl + ROH \rightarrow R'_2POR + HCl$
(5) $\quad R'_2POR + HCl \rightarrow R'_2POH + RCl$ R and R' represent aliphatic or aromatic radicals.

The purpose of the organic base in the examples cited was to remove the corrosive hydrogen chloride as it was generated. This was done by precipitation as the insoluble hydrochloride of the organic base.

Another method of preparation found in the literature comprises reacting a mixture of halogenated abietate and aryl or alkyl phosphorous chloride in the presence of metallic sodium. The following equations illustrate this:

$$(RO)_2PCl + R'Cl + 2Na \rightarrow (RO)_2PR' + 2NaCl$$
$$ROPCl_2 + 2R'Cl + 4Na \rightarrow ROPR'_2 + 4NaCl$$

(E. F. Enqelke, U.S. Patent 2,377,870 to Cities Service Oil Co.) In these equations R represents an alkyl or aryl group and R' represents abietate.

Still another method of preparation is based on the reaction of the alkyl or aryl phosphonous or phosphinous chloride with alcohol in the presence of an alkali metal alkoxide.

The tertiary amine method is not commercially feasible. The costly and tedious recovery, purification and reuse of the expensive organic base is prohibitive. Use of the alkali metal alkoxides as the HCl acceptor results in many undesirable side reactions and consequently gives very low yields. The difficulty, expense and danger in handling metallic sodium are obvious drawbacks concerning the remaining method.

Broadly speaking the main object of my invention is to provide a commercially feasible process for the production of aliphatic and aromatic esters of phosphonous and phosphinous acids.

I have discovered that the reaction of the aliphatic or aromatic phosphonous dichlorides or phosphinous chlorides with alcohols or phenols may be carried out in the presence of anhydrous ammonia. Good yields are obtained of substantially pure esters of aliphatic and aromatic phosphonous and phosphinous acids.

Broadly stated, the process is carried out by the addition of the requisite chloride to an aliphatic alcohol or a phenol with the simultaneous, controlled addition of ammonia.

The reactions may be represented by the following equations:

$$RPCl_2 + 2R'OH + 2NH_3 \rightarrow RP(OR')_2 + 2NH_4Cl$$
$$R_2PCl + R'OH + NH_3 \rightarrow R_2POR' + NH_4Cl$$

R and R' represent aliphatic or aromatic radicals. In addition to the useful esters obtained by this reaction, the ammonia can be recovered from the ammonium chloride by the conventional method and resused, or the ammonium chloride can be used as fertilizer material.

In the past anhydrous ammonia as an agent for the removal of the corrosive hydrogen chloride has been considered impractical since it will react under ordinary conditions with the phosphonous and phosphinous chlorides to form phosphorous amido compounds in the following manner:

$$RPCl_2 + 4NH_3 \rightarrow RP(NH_2)_2 + 2NH_4Cl$$
$$R_2PCl + 2NH_3 \rightarrow R_2PNH_2 + NH_4Cl$$

R has the same meaning as above. Undoubtedly many more complex reactions also occur.

It should be clearly understood that the tertiary amines used in the prior art practice are not subject to the above reactions with the phosphonous and phosphinous chlorides since these tertiary amines have no replaceable hydrogen attached to the nitrogen atom.

In my invention I have successfully removed the corrosive hydrogen chloride without the use of prohibitively expensive organic bases and at the same time I have obviated the undesirable reactions of ammonia with the phosphonous and phosphinous halides. By my method I have prepared diethyl methylphosphonite, dioctyl ethylphosphonite, dihexyl phenylphosphonite, diethyl octylphosphonite and butyl diethylphosphinite in yields of 66.8, 40.0, 45.4, 30.6 and 21.7% respectively. The purities of these materials are very good.

Ammonia has been used in the past as a neutralizer for hydrogen chloride in the formation of trialkyl phosphites from $PCl_3$ and alcohols. Its use in the formation of esters of aliphatic and aromatic phosphonous and phosphinous acids was not considered practical because of the greater reactivity of $RPCl_2$ and $R_2PCl$ as compared to $PCl_3$. This enhanced reactivity is evidenced by the fact that these compounds add sulfur much more vigorously than $PCl_3$. They are oxidized more easily than $PCl_3$. Consequently, it was assumed that they would react more readily with $NH_3$ and that ammonia was not feasible for use in this reaction. My discovery is therefore surprising and certainly unpredictable from the above prior art.

My invention, more specifically, comprises forming the dialiphatic or diaromatic ester of an aliphatic or aromatic phosphonous acid or the aliphatic or aromatic ester of an aliphatic or aromatic phosphinous acid by adding the requisite chloride to at least a chemically equivalent amount of the appropriate alcohol or phenol and at the same time adding dry ammonia to the reaction mixture so that the hydrogen chloride generated is just neutralized. I have found that by controlling the addition of the dry ammonia gas, and thus controlling the pH of the reaction mixture, the reaction proceeds smoothly and good yields of the desired product are obtained. When the addition is completed, the ammonium chloride is removed and the excess alcohol or phenol or solvent is evaporated to yield the relatively pure ester. Simple distillation yields a further purified product.

It is desirable to use an inert solvent for the reactants in carrying out the process of my invention. Many inert solvents, such as ether, pentane, hexane, heptane, etc. are suitable. An excess of alcohol or phenol may function as its own solvent. However, alcohols solubilize ammonium chloride to some extent, so that complete removal of this salt from solutions containing excess alcohol is difficult. Because the esters of phosphonous and phosphinous acids are somewhat sensitive to hydrolysis in contact with water having a pH below 7, it is preferred to use a dilute solution of a suitable base, such as sodium hydroxide, to remove the ammonium chloride.

The rate of ammonia addition is controlled so that the reaction mixture stays essentially at the neutral point. A pH meter connected to the reaction mixture gives continuous readings and allows ammonia addition to be increased if the mixture becomes too acidic and decreased if the mixture becomes too basic. This arrangement insures that the hydrogen chloride liberated during the reaction is neutralized and at the same time prohibits the mixture from becoming too basic, which in itself causes harmful side reactions as previously illustrated.

The amount of solvent necessary for the most efficient operation of my process varies with the operating temperature, the length of the carbon chains or size of the aromatic group and the efficiency of stirring. Generally speaking, the amount of solvent for most efficient operation varies from about 1:1 to about 3:1 by volume of phosphonite or phosphinite ester expected.

The optimum temperature for most efficient operation also varies according to the length of the carbon chains and the efficiency of stirring. The amount of solvent used also affects the optimum temperature for reaction. Generally speaking, as the amount of solvent is lowered, the optimum operating temperature is lowered.

While the pH method of determining basicity or acidity is used for illustration, I am not limited to this method of observing and maintaining neutral conditions. Any method used for such observation (spectrophotometric, colorimetric, electronic, simple stoichiometric addition, etc.) falls within the scope of my invention.

My invention is illustrated but not limited by the following examples:

EXAMPLE I

*Diethyl methylphosphonite*

54.7 g. (0.468 mole) of methylphosphonous dichloride in 50 ml. of pentane was added slowly over a period of 30 minutes to a stirred solution of 50 g. (1.086 moles) of ethanol in 350 ml. of pentane. The temperature was maintained in the range of 20° C. to 25° C.

The pH of the reaction mixture, as indicated by a pH meter with a dripping KCl electrode, was held in the range of 7.0–8.5 by the addition of anhydrous ammonia. Upon completion of the addition, stirring was continued for 30 minutes at 0–5° C. The mixture was then washed with 800 ml. of 3.5% NaOH solution and dried over $Na_2SO_4$.

The product was freed of solvent by stripping, and distillation of the residue gave 66.8% of diethyl methylphosphonite; B.P. 120–122° C.; $n_D^{26°\ C.}$ 1.4153; $d_4^{20}$ 0.905.

EXAMPLE II

*Dioctyl ethylphosphonite*

69.0 g. (0.527 mole) of ethylphosphonous dichloride in 50 ml. of hexane was added slowly over a period of 30 minutes to a stirred solution of 143.2 g. (1.1 moles) of octyl alcohol and 0.1 g. methyl red indicator in 250 ml. of hexane. The temperature was maintained at approximately 20° C. throughout the addition.

The mixture was maintained at a pH of 7.0–8.5 by the simultaneous addition of anhydrous ammonia. Upon completion of the addition, stirring was continued for 30 minutes at 0° C. to 5° C. The mixture was then washed with 3.5% NaOH solution in an amount equal to the total volume of the mixture. The organic layer was separated and dried over $Na_2SO_4$.

The product was freed of solvent by stripping, and distillation of the residue gave a 40.0% yield of dioctyl ethylphosphonite; B.P. 119–124° C. at 0.15 mm; $n_D^{25°\ C.}$ 1.4459; $d_4^{20}$ 0.878.

EXAMPLE III

*Dihexyl phenylphosphonite*

46.0 g. (.257 mole) of phenylphosphonous dichloride in 50 ml. of hexane was added slowly over a period of 30 minutes to a stirred solution of 57.2 g. (0.561 mole) of hexyl alcohol and 0.1 g. methyl red indicator in 250 ml. of hexane. The temperature was maintained at approximately 20° C. throughout the addition.

The pH of the reaction mixture was kept in the range of 7.0–8.5 by the simultaneous addition of anhydrous ammonia. Upon completing the addition, the reaction mixture was stirred for 30 minutes at 0–5° C. It was then washed twice with a volume of 3.5% NaOH solution equal to the volume of the mixture and dried over $Na_2SO_4$.

The product was freed of hexane by stripping and distillation of the residue gave a 45.4% yield of dihexyl phenylphosphonite; B.P. 123–126° C. at 0.3 mm; $n_D^{25°\ C.}$ 1.4880; $d_4^{20}$ 0.954.

EXAMPLE IV

*Diethyl octylphosphonite*

49.4 g. (0.230 mole) octylphosphonous dichloride in 50 ml. hexane was added slowly over a period of 30 minutes to a stirred solution of 23.0 g. (0.50 mole) of ethyl alcohol and 0.1 g. methyl red indicator in 210 ml. of hexane. The temperature was maintained in the range of 5–10° C. throughout the addition.

The pH of the reaction mixture was kept between 7.0–8.5 by the simultaneous addition of anhydrous ammonia. Upon completion of the addition stirring was continued for 30 minutes at 0–5° C. The mixture was then washed twice with a volume of 10% NaOH solution equal to the total volume of the mixture. The organic layer was dried over $Na_2SO_4$.

The product was freed of solvent by stripping and distillation of the residue gave a 30.6% yield of diethyl phenylphosphonite; B.P. 58–60° C. at 0.12 mm; $n_D^{25°\ C.}$ 1.4384; $d_4^{20}$ 0.927.

EXAMPLE V

Butyl diethylphosphinite 26.9 g. (0.216 mole) diethylphosphinous chloride in 50 ml. of hexane was added slowly over a period of 30 minutes to 16.8 g. (0.227 mole) butyl alcohol and 0.1 g. of methyl red indicator in 100 ml. of hexane. The temperature was maintained at about 10° C. during the addition.

The mixture was maintained at a pH of about 7.0–8.5 by the simultaneous addition of anhydrous ammonia. Upon completion of the addition, stirring was continued for 30 minutes at 0° C. to 5° C. The mixture was then washed twice with a volume of 10% NaOH equal to the total volume of the mixture. The organic layer was separated and dried over $Na_2SO_4$.

The product was freed of hexane by stripping and distillation of the residue gave a 21.7% yield of butyl diethylphosphinite; B.P. 70–73° C. at 19.5 mm.; $n_D^{25°C}$ 1.4390; $d_4^{20}$ 0.921.

As appears from the foregoing disclosure, my invention is applicable for the production of esters of various phosphonous and phosphinous acids generally by the reaction of the requisite chloride with various alcohols or phenols, including primary and secondary alcohols in which the hydrocarbon group is straight chain or branched, saturated and unsaturated alcohols and alcohols in which hydrogen of the hydrocarbon group is unsubstituted or substituted by substitutents such as halogen, etc., and including phenols in which one or more hydrogens are substituted by substituents such as halogen, etc.

As also appears from the foregoing disclosure, the chloride can be an aromatic or aliphatic chloride in the case of phosphonous dichlorides, or it can be diaromatic, the aromatic groups being the same or different, dialiphatic, the aliphatic groups being the same or different, or a mixed aliphatic-aromatic chloride in the case of phosphinous chlorides. Such aliphatic groups may be saturated or unsaturated, straight chain or branched, substituted or unsubstituted. The aromatic group may be mono-, di- or polynuclear and it may be substituted or unsubstituted.

While the use of inert solvent, excess of the alcohol or both, or the use of excess phenol, inert solvent or both, is not essential, such use is an important feature of the process from the standpoint of economical production of the desired esters.

While I have described more particularly the addition of a phosphonous or phosphinous chloride to a body of the alcohol in the presence or absence of inert solvent and with the simultaneous addition of anhydrous ammonia at such a rate as to maintain the reaction mixture substantially neutral, the reaction may be carried out by simultaneous addition of the chloride and the alcohol to a reaction space which may at the start be empty or may contain some of the alcohol and/or inert solvent provided that anhydrous ammonia also is added at such a rate as to maintain the reaction mixture substantially neutral and provided further than an excess of the phosphonous or phosphinous chloride in the reaction mixture is avoided.

I claim:

1. Process for the production of compounds of the general formula $$(R)_mP(OR')_n$$

in which R and R' each stands for a member of the group consisting of alkyl and phenyl radicals, $m$ and $n$ are integers and the sum of $m$ and $n$ is 3, which comprises gradually adding a compound of the general formula $(R)_mP(Cl)_n$ in which R is a member of the group consisting of alkyl and phenyl radicals and $m$ and $n$ are integers the sum of which is 3 to a body of a compound of the general formula R'OH in which R' is a member of the group consisting of alkyl and phenyl radicals while stirring and while maintaining the reaction mixture substantially neutral by the addition of ammonia, the total quantity of said compound $(R)_mP(Cl)_n$ added being not greater than the stoichiometric equivalent of said compound R'OH and washing the resulting reaction mixture with an alkaline aqueous solution.

2. Process as defined in claim 1 in which the quantity of said compound R'OH in the reaction mixture is stoichiometrically in substantial excess of the quantity of said compound $(R)_mP(Cl)_n$.

3. Process as defined in claim 1 in which the reaction mixture contains an excess of said compound R'OH serving as solvent for the reaction mixture.

4. Process as defined in claim 1 in which the reaction is carried out in the presence of an inert solvent.

5. Process as defined in claim 1 in which said compound $(R)_mP(Cl)_n$ is added gradually to a body of said compound R'OH and an inert solvent.

6. Process as defined in claim 1 in which a solution of said compound $(R)_mP(Cl)_n$ in an inert solvent is gradually added to said compound R'OH.

7. Process as defined in claim 1 in which a solution of said compound $(R)_mP(Cl)_n$ in an inert solvent is gradually added to a body of a solution of said compound R'OH in said inert solvent.

8. Process for the production of compounds of the general formula $(R)_mP(OR')_n$ in which R is a member of the group consisting of alkyl and phenyl radicals, R' is a member of the group consisting of aliphatic and phenyl radicals and in which $m$ and $n$ are integers, the sum of which is 3, which comprises gradually adding a solution of a compound of the general formula $(R)_mP(Cl)_n$, in which R is a member of the group consisting of alkyl and phenyl radicals and $m$ and $n$ are integers the sum of which is 3, in an inert solvent to a body of a solution of a compound of the general formula R'OH, in which R' is a member of the group consisting of alkyl and phenyl radicals, in said inert solvent in the presence of an acid-base indicator while maintaining said body under vigorous agitation and substantially neutral by the addition of anhydrous ammonia, the amount of said compound $(R)_mP(Cl)_n$ added being not greater than the stoichiometric equivalent of the amount of said compound R'OH and washing the resulting reaction mixture with a water solution of sodium hydroxide.

9. Process as defined in claim 8 in which R is methyl, $m$ is 1 and R' is ethyl.

10. Process as defined in claim 8 in which R is ethyl, $m$ is 1 and R' is octyl.

11. Process as defined in claim 8 in which R is phenyl, $m$ is 1 and R' is hexyl.

12. Process as defined in claim 8 in which R is octyl, $m$ is 1 and R' is ethyl.

13. Process as defined in claim 8 in which R is ethyl, $m$ is 2 and R' is butyl.

References Cited in the file of this patent

UNITED STATES PATENTS 2,678,940   Boyer et al. _____ May 18, 1954

OTHER REFERENCES

Kosolapoff: Organophosphorus Compounds, John Wiley & Sons, New York, 1950, pages 139 and 184.

UNITED STATES PATENT OFFICE
CERTIFICATE OF CORRECTION

Patent No. 2,903,475

September 8, 1959

Charles Lichtenberg Harowitz

It is hereby certified that error appears in the printed specification of the above numbered patent requiring correction and that the said Letters Patent should read as corrected below.

Column 6, line 33, for "aliphatic" read -- alkyl --.

Signed and sealed this 22nd day of March 1960.

(SEAL)
Attest:

KARL H. AXLINE
Attesting Officer

ROBERT C. WATSON
Commissioner of Patents